United States Patent
Uezono et al.

(10) Patent No.: US 8,383,986 B2
(45) Date of Patent: Feb. 26, 2013

(54) ARC START CONTROL METHOD IN ROBOT WELDING

(75) Inventors: Toshiro Uezono, Osaka (JP); Tetsuo Era, Osaka (JP); Tomoyuki Ueyama, Osaka (JP); Shugo Hirota, Osaka (JP)

(73) Assignee: DAIHEN Corporation, Osaka (JP)

( * ) Notice: Subject to any disclaimer, the term of this patent is extended or adjusted under 35 U.S.C. 154(b) by 325 days.

(21) Appl. No.: 11/493,158

(22) Filed: Jul. 26, 2006

(65) Prior Publication Data
US 2007/0023407 A1    Feb. 1, 2007

(30) Foreign Application Priority Data
Jul. 29, 2005    (JP) .................. 2005-220222

(51) Int. Cl.
*B23K 9/10* (2006.01)
*B23K 9/12* (2006.01)

(52) U.S. Cl. ........... 219/130.21; 219/130.01; 219/130.1; 219/130.5

(58) Field of Classification Search ............... 219/130.1, 219/137.71, 130.5, 130.51
See application file for complete search history.

(56) References Cited

U.S. PATENT DOCUMENTS

| | | | |
|---|---|---|---|
| 4,647,754 A * | 3/1987 | Hirasawa | 219/130.21 |
| 6,518,545 B1 * | 2/2003 | Richard et al. | 219/130.21 |

FOREIGN PATENT DOCUMENTS

| | | |
|---|---|---|
| DE | 90 13 550.4 | 2/1991 |
| EP | 1 354 659 | 10/2003 |
| JP | 07155948 A * | 6/1995 |
| JP | 2002-160059 | 6/2002 |
| JP | 2002-178145 | 6/2002 |
| JP | 2002-205169 | 7/2002 |
| JP | 2003-145266 | 5/2003 |
| JP | 2005-7453 | 1/2005 |
| WO | WO 85/00024 | 1/1985 |

OTHER PUBLICATIONS

European Search Report for the corresponding EP 06253929.1, mailed Nov. 28, 2006.

* cited by examiner

*Primary Examiner* — Tu B Hoang
*Assistant Examiner* — Ayub Maye
(74) *Attorney, Agent, or Firm* — Hamre, Schumann, Mueller & Larson, P.C.

(57) ABSTRACT

An arc start control method in robot welding includes the steps of shorting a welding wire with a base metal, retracting a welding torch by a welding robot for taking the welding wire off the base metal to generate an initial arc, retracting the welding torch to a predetermined position with maintaining the initial arc maintained while applying an initial arc current smaller than a steady welding current during this initial arc period, and starting to feed the welding wire steadily and to supply the steady welding current so as to make a transition from the initial arc to a steady arc as well as starting to move the welding torch along a welding line. During a re-shorting prevention period which starts from a beginning of the initial arc period, a re-shorting prevention current which is larger than the initial arc current is applied in order to prevent re-shortening between the wire tip and the base metal right after the initial arc was generated. Thereafter, the initial arc current is applied.

5 Claims, 6 Drawing Sheets

ARC START CONTROL METHOD IN ROBOT WELDING

BACKGROUND OF THE INVENTION

1. Field of the Invention

The present invention relates to an arc start control method in robot welding for improved arc start in the retract arc starting in which the welding wire is first shorted with the base metal and then the welding torch is retracted by the welding robot to move the welding wire off the base metal to generate an arc.

2. Description of the Related Art

Figure 5:
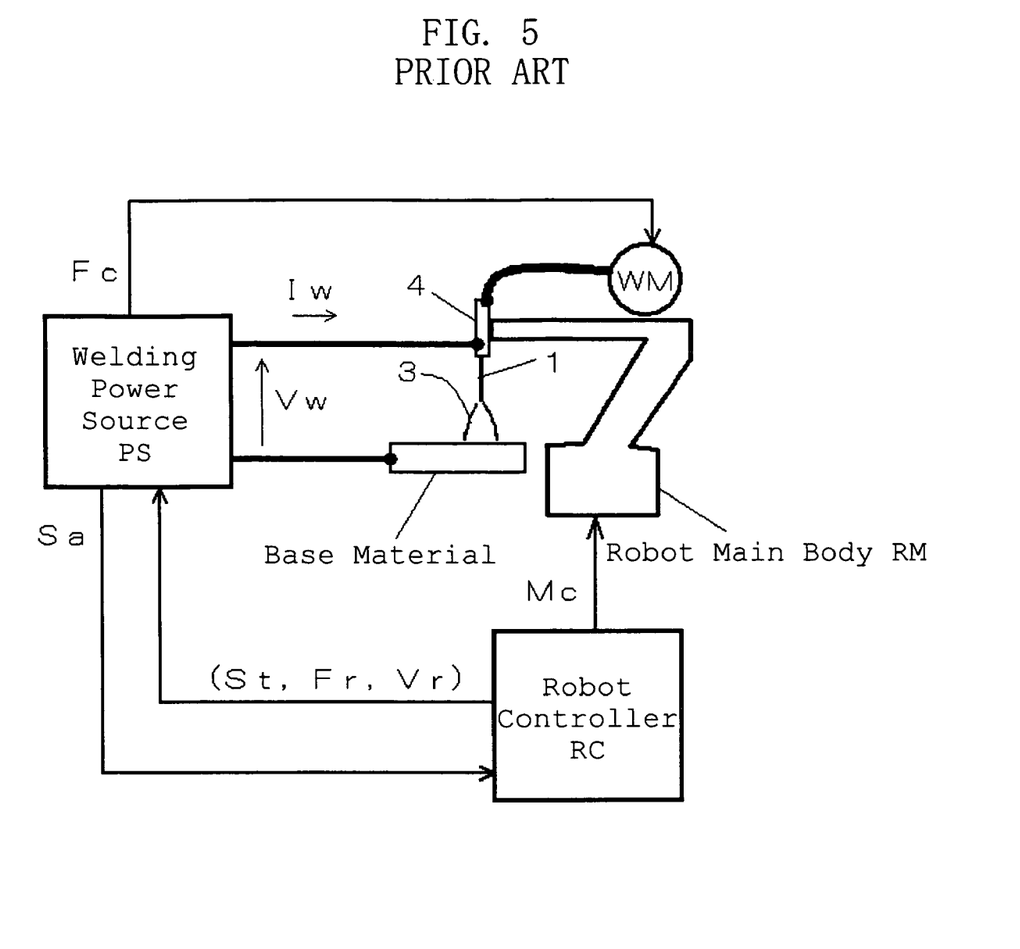
FIG. 5 is a configuration chart of a prior-art robot welder.

FIG. 5 is a configuration diagram of a robot welder which performs consumable electrode arc welding. A robot controller RC outputs an operation control signal Mc for controlling operation of a multi-axis servo motor disposed in a robot main body (manipulator) RM, as well as sending and receiving interface signals which include a welding start signal St, a feeding rate setting signal Fr, a welding voltage setting signal Vr and a short/arc determination signal Sa, to and from a welding power source PS. The welding power source PS, which receives and sends the interface signals, outputs a welding voltage Vw and a welding current Iw, as well as outputting a feeding control signal Fc for controlling a wire feeding motor WM. The robot main body RM is mounted with the wire feeding motor WM, a welding torch 4 and so on, and moves a tip (TCP) of the welding torch 4 along a predefined welding line. When the welding wire 1 is fed by the wire feeding motor WM through the welding torch 4, an arc 3 is generated between the wire and the base metal 2, and welding starts.

Figure 6:
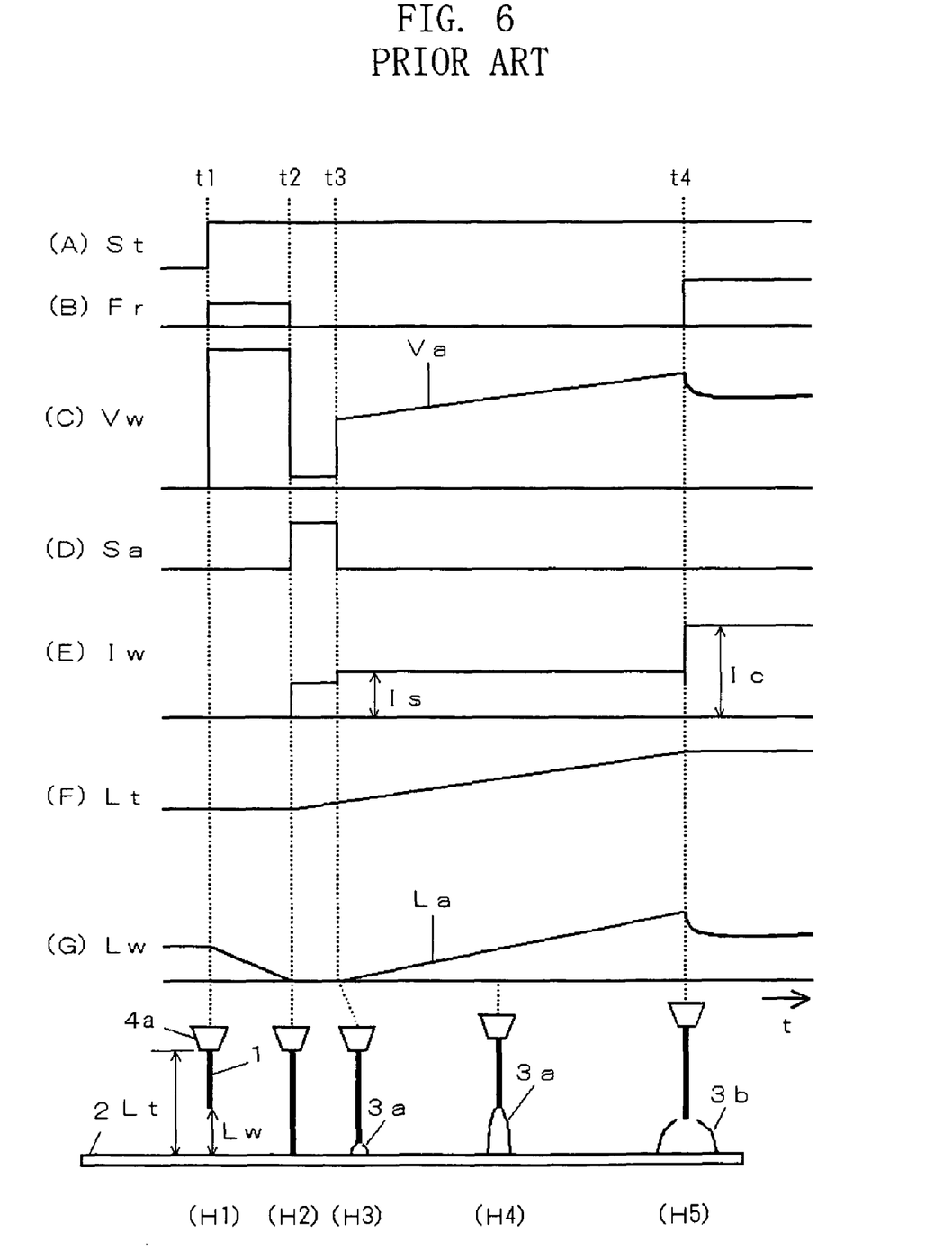
FIG. 6 is a timing chart of an arc start control method in robot welding in prior art.

FIG. 6 is a timing chart of a retract art starting method which uses the above-described robot welder. In the figure, (A), (B), (C), (D), (E), (F), and (G) show the time course change of the welding start signal St, the feeding rate setting signal Fr, the welding voltage Vw, the short/arc determination signal Sa, the welding current Iw, a distance Lt between a power supply chip 4a and a base metal, a distance Lw between the wire tip and the base metal (the distance is an arc length La when the arc is present), respectively. (H1) through (H5) illustrate states at the arc generation location at different time points. Hereinafter, description will be made with reference to FIG. 6.

(1) Time Point t1 through t2; Slow-Down Feeding Period

At Time Point t1, the robot brings and stops the welding torch onto the welding start location. When the robot controller RC outputs the welding start signal St (High level) as shown by (A), the feeding rate setting signal Fr switches for a slow-down feeding rate as shown by (B) and the welding wire is fed at the slow-down feeding rate. Simultaneously, as shown by (C), the welding power source PS starts outputting the power, and thus the welding voltage Vw becomes a no-load voltage. During this period, as shown by (F), the welding torch is at a stop and thus the chip-to-base-metal distance Lt has a constant value. On the other hand, as shown by (G), the wire-tip-to-base-metal distance Lw decreases gradually due to the slow-down feeding.

(2) Time Point t2 through t3; Short-Circuit Period

At Time Point t2, as shown by (H2) in the figure, the wire tip is shorted with the base metal. The welding voltage Vw goes down to assume a low short voltage value as shown by (C), and then this voltage change is detected to turn the short/arc determination signal Sa to the High level (Short) as shown by (D). In response, the feeding rate setting signal Fr becomes zero as shown by (B) to stop the feeding. Simultaneously, as shown by (E), a short-circuit current flows which has a small current value of 20 through 80 amperes approximately. Further, simultaneously, the welding torch starts to move off the base metal (retracting movement) and thus, as shown by (F), the chip-to-base-metal distance Lt increases gradually.

(3) Time Point t3 through t4; Retracting Period

At Time Point t3, as shown by (H3), the retracting movement of the welding torch creates a gap between the wire tip and the base metal, whereby an initial arc 3a is generated. The welding voltage Vw increases to become an arc voltage Va which assumes a few tens of volts as shown by (C), and the short/arc determination signal Sa switches to Low level (Arc) as shown by (D). In response to this, as shown by (E), the welding current Iw switches to an initial arc current Is which is more or less the same level as the short-circuit current. Generally, a constant-current control is provided in order to maintain the initial arc current Is at a consistent value. As shown by (F), the retracting movement of the welding torch continues until a predetermined position is reached at Time Point t4. As shown by (H4), the initial arc 3a is maintained during this period, while as shown by (G), the arc length La (=Lw) increases gradually by a distance equal to the distance corresponding to the retracting movement. This period continues for 100 through 500 ms approximately.

(4) Time Point t4 and thereafter; Steady Period

At Time Point t4, as shown by (F), the welding torch reaches the predetermined position at the end of its retracting movement. Then, the feeding rate setting signal Fr switches for a steady feeding rate as shown by (B), whereby steady feeding of the welding wire is started. Simultaneously, as shown by (E), supply of a steady welding current Ic in consideration of the steady feeding is started. The welding torch starts to move along the welding line. In other words, after Time Point t4, a steady arc start control for consumable electrode arc welding is provided. The arc length La in this period converge to the steady arc length as shown by (G), and the initial arc 3a makes the shift to a steady arc 3b as shown by (H5).

The above description for the period from Time Point t1 to t2 was for a case in which the feeding of the welding wire is made to create short circuit. However, the feeding may be stopped and the welding torch may be moved closer to the base metal (forward movement). The retraction arc starting as described above ensures good arc starting to difficult materials (e.g. aluminum alloys and stainless steels) which would not allow a good arc start under a common method of arc starting. Further, the retraction arc starting enables to dramatically reduce the amount of spatters when welding steel. Due to these characteristics, the retraction arc starting is used in high quality welding. See JP-A 2002-178145 Gazette and JP-A 2002-205169 Gazette for more details of the above-described prior art.

As shown in FIG. 6, at Time Point t3, the initial arc is generated in a small gap created by the retracting movement of the welding torch between the wire tip and the base metal. The retracting movement of the welding torch is continued also thereafter and the arc length increases gradually as shown by (G). Meanwhile, the welding wire is fed through a cable of the welding torch, and during the feeding the wire meanders to some extent in the cable. The amount of meandering represents the amount of play in the feeding. The amount of play in the feeding can increase depending on the welding attitude of the welding torch. Further, as the robot moves, there is always small vibration, and the welding torch also vibrates during the retracting movement. Right after Time Point t3, there is already a small gap at the wire tip, and the above-described play for the welding wire sometimes causes an abrupt change of the wire tip position. Similarly, the vibration of the welding torch also causes an abrupt change in the wire tip position. These changes of the wire tip position are small, being as small as 1 to 2 mm. However, the gap (arc length) right after Time Point t3 is smaller than 1 mm approximately and therefore, if the wire tip moves toward the base metal, the wire tip and the base metal short again. On the other hand, if the wire tip moves away from the base metal, the arc length will become slightly longer, and this does not cause any serious problem. The re-shorting does, however; since the initial arc has already made a molten on the wire tip surface, the re-shorting will cause the wire tip to adhere to the base metal. When this happens, a large electric current of a few hundreds of amperes is necessary in order to break the adhesion, resulting in poor arc start with a large amount of spatters. Therefore, preventing the re-shorting right after the initial arcing is important in order to provide good arc starting.

SUMMARY OF THE INVENTION

Thus, the present invention provides an arc start control method in robot welding capable of preventing re-shorting right after the initial arcing and providing good arc starting.

In order to solve the above-described problems, the present invention provides an arc start control method in robot welding comprising the steps of: shorting a welding wire with a base metal; retracting a welding torch by a welding robot for taking the welding wire off the base metal to generate an initial arc; retracting the welding torch to a predetermined position with maintaining the initial arc maintained while applying an initial arc current smaller than a steady welding current during this initial arc period; and starting to feed the welding wire steadily and to supply the steady welding current so as to make a transition from the initial arc to a steady arc as well as starting to move the welding torch along a welding line, wherein, during a re-shorting prevention period which starts from a beginning of the initial arc period, a re-shorting prevention current which is larger than the initial arc current is applied in order to prevent re-shortening between the wire tip and the base metal right after the initial arc was generated, wherein, thereafter, the initial arc current is applied.

Such a method enables rapid increase in the arc length through the application of the re-shorting prevention current which has a large value, upon generation of the initial arc. This enables to prevent re-shorting between the wire tip and the base metal even if there is an abrupt positional change of the wire tip caused by the above-described play or vibration, enabling to achieve a good arc starting.

Preferably, the re-shorting prevention period ends when an arc voltage has substantially attained a predetermined value which corresponds to a predetermined arc length.

Such a method enables to adjust the arc length to an appropriate value at the end of the re-shorting prevention period, through a variable control of the re-shorting prevention period based on the arc voltage, enabling to further improve the arc starting.

Preferably, the re-shorting prevention current is varied substantially in inverse proportion to the arc voltage.

Such a method enables to adjust the arc length to an appropriate value at the ending of the re-shorting prevention period, through a variable control of the re-shorting prevention current based on the arc voltage, enabling to further improve the arc starting.

DETAILED DESCRIPTION OF THE PREFERRED EMBODIMENT

Hereinafter, embodiments of the present invention will be described with reference to the drawings.

Embodiment 1

Figure 1:
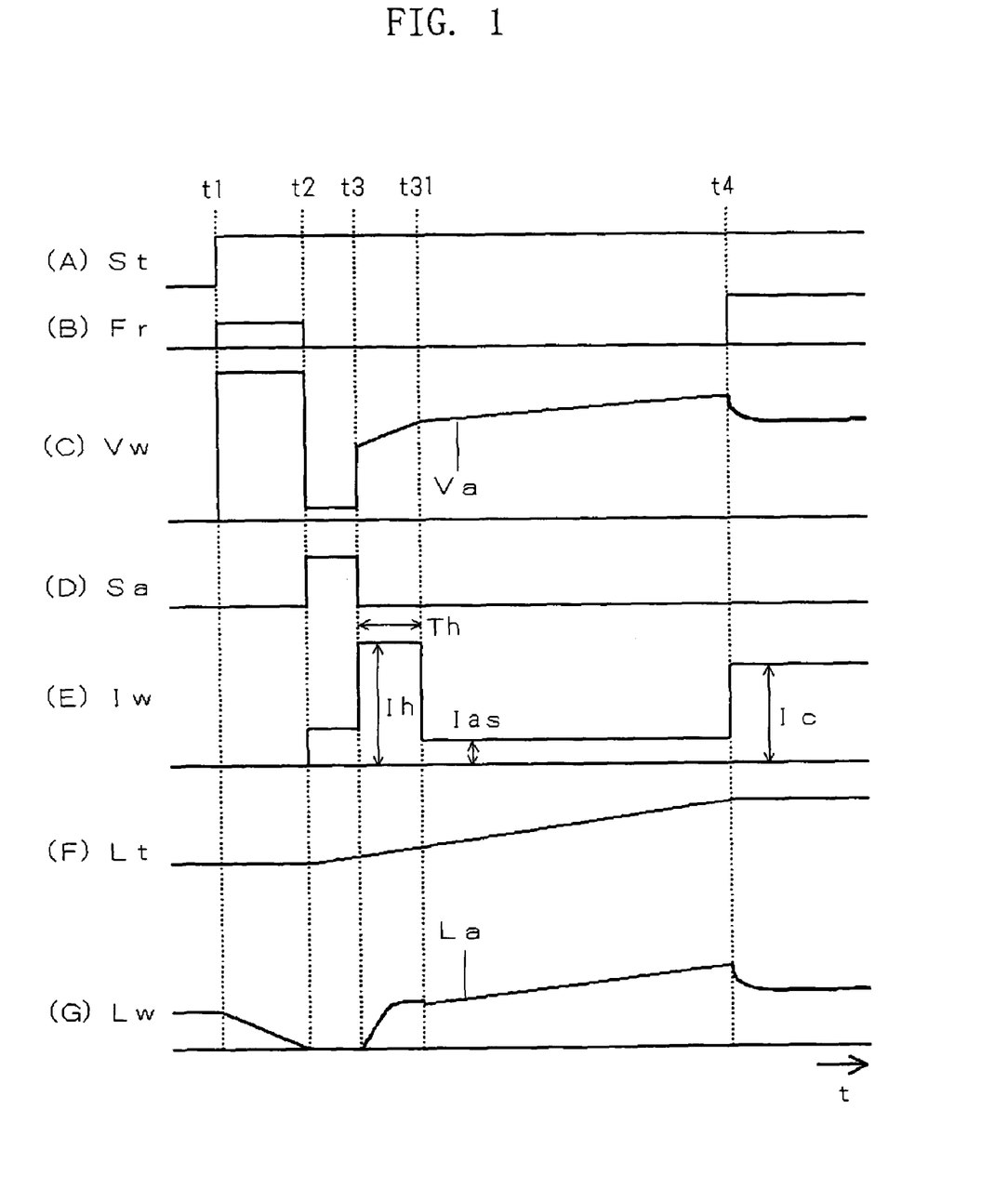
FIG. 1 is a timing chart of an arc start control method in robot welding as Embodiment 1 according to the present invention.

FIG. 1 is a timing chart of an arc start control method in robot welding according to Embodiment 1 of the present invention. In the figure, (A), (B), (C), (D), (E), (F), and (G) show time course changes of a welding start signal St, a feeding rate setting signal Fr, a welding voltage Vw, a short/arc determination signal Sa, a welding current Iw, a chip-to-base-metal distance Lt, and a wire-tip-to-base-metal distance Lw (=arc length La), respectively. The embodiment uses a welder having the same configuration as described with reference to FIG. 5 above. FIG. 1 corresponds to FIG. 6, and illustrates the same operations up to Time Point t3, so these will not be described again. Hereinafter, description will cover operations at and after Time Point t3.

At Time Point t3, as shown by (G), as the retracting movement of the welding torch creates a gap between the wire tip and the base metal, an initial arc is generated. As shown by (C), the welding voltage Vw increases to become an arc voltage Va, and as shown by (D), the short/arc determination signal Sa switches to Low level (Arc). In response to this, as shown by (E), a predetermined, large re-shorting prevention current Ih is supplied during a predetermined re-shorting prevention period Th. This operation quickly increases the arc length La as shown by (G), since the re-shorting prevention current Ih having a large value causes quick melting and burning of the wire tip, which leads to increase the arc length. Thus, the re-shorting prevention period Th and the re-shorting prevention current Ih are given respective values to optimize this burning. Note further, that appropriate values for the two vary depending on the material and diameter of the welding wire, the welding method employed, etc. As examples of the values, the re-shorting prevention period Th may be 5 through 50 ms approximately. The re-shorting prevention current Ih may range from 20 through 80A approximately, which is greater than the initial arc current Ias and close to the steady welding current Ic. Due to the quick increase in the arc length La during the re-shorting prevention period Th, no re-shorting will occur even if the play or vibration brings the wire tip abruptly toward the base metal.

The re-shorting prevention period Th ends at Time Point t31. Then, as shown by (E), the welding current Iw switches from the re-shorting prevention current Ih to an initial arc current Ias. A small current value which can barely melt the wire tip is sufficient for the initial arc current Ias. For this reason, the power supply control for the re-shorting prevention current Ih can employ any one of constant-current control and constant-voltage control. At Time Point t4, as shown by (F), the retracting movement brings the welding torch to a predetermined position. Then, as shown by (B), the feeding rate setting signal Fr switches to the steady feeding rate, whereupon steady feeding of the welding wire is started. Likewise, as shown by (E), the welding current Iw is switched to a steady welding current Ic which corresponds to the steady feeding rate, leading the initial arc to a smooth transition to a steady arc. As (E) shows, the re-shorting prevention current Ih has a constant value. Alternatively, the current may be decreasing with time. This has a specific purpose of increasing the arc length as quickly as possible after the initial arc was generated. As shown in FIG. 1, the re-shorting prevention period Th which is a period from Time Point t3 through t31 is shorter than a half of the initial arc period which is a period from Time Point t3 through t4.

Embodiment 2

Figure 2:
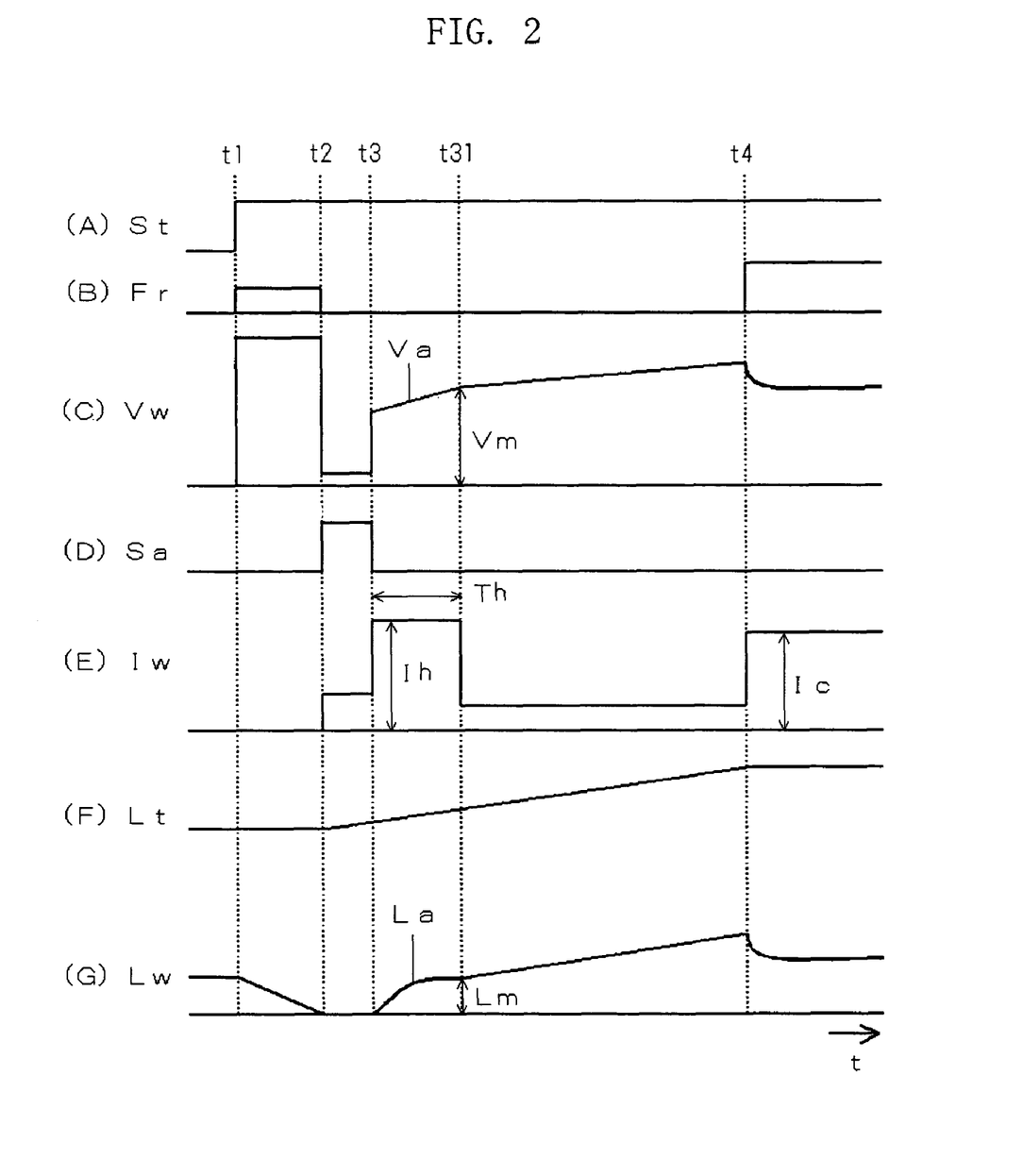
FIG. 2 is a timing chart of an arc start control method in robot welding as Embodiment 2 according to the present invention.

FIG. 2 is a timing chart of an arc start control method in robot welding according to Embodiment 2 of the present invention. This figure corresponds to the above-described FIG. 1, differing only in variable control of the re-shorting prevention period Th. Hereinafter, the difference will be described with reference to FIG. 2.

The re-shorting prevention period Th begins at Time Point t3 upon generation of the initial arc, and ends at Time Point t31 when the arc length La achieves a predetermined value Lm. Specifically, the determination that the arc length La reaches a predetermined value Lm as shown by (G) is performed by checking that the voltage Va reaches a predetermined value Vm, as shown by (C), corresponding to the arc length Lm. This enables to set the arc length La to an appropriate value surely at the time when the re-shorting prevention period Th ends. Therefore, this eliminates the need for time-consuming experiments in an attempt to obtain appropriate value of the re-shorting prevention period Th for many different welding conditions. Although the degree of movement and and the direction of the wire tip described above are different every time, it is now possible to absorb these fluctuations, and to adjust the arc length to a predetermined value. Therefore, it is now possible to further improve arc starting.

Embodiment 3

Figure 3:
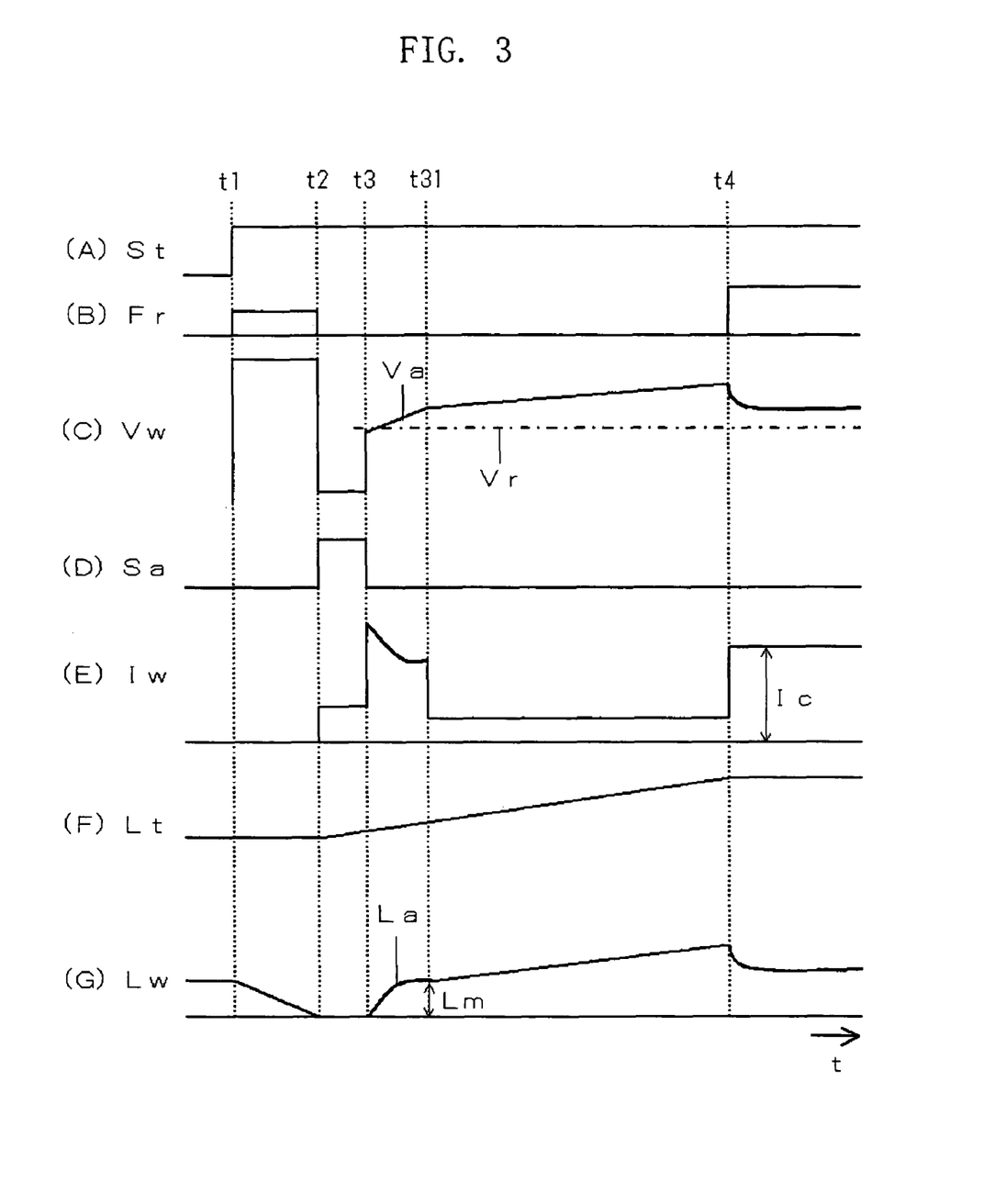
FIG. 3 is a timing chart of an arc start control method in robot welding as Embodiment 3 according to the present invention.

FIG. 3 is a timing chart of an arc start control method in robot welding according to Embodiment 3 of the present invention. This figure corresponds to the above-described FIG. 1, differing only in variable control of the re-shorting prevention current Ih. Hereinafter, the difference will be described with reference to FIG. 3.

The re-shorting prevention current Ih is controlled so as to be substantially in inverse proportion to the change in arc voltage Va shown by (C) in the figure. Specifically, in accordance with a function Ih=f(Va), the re-shorting prevention current Ih is varied as a function of the arc voltage Va. When the arc voltage Va increases, the re-shorting prevention current Ih decreases in an inverse relationship. An example of the function is Ih=Ih0-70·(Va−Vr), where the initial value Ih0≅Ic, and Vr represents the welding voltage set value. According to this function, when the arc voltage Va increases by 1 V, the re-shorting prevention current Ih decreases by 70 A. Note that the value for the re-shorting prevention period Th is predetermined. This arrangement will give a consequence as shown by (G), that the arc length La (arc voltage Va) is brought to a predetermined value Lm through a variable control of the re-shorting prevention current Ih. In other words, Embodiment 2 varies the re-shorting prevention period Th in response to the arc voltage Va whereas the present Embodiment varies the re-shorting prevention current Ih in response to the arc voltage Va. In both methods, the arc length La at the end of the re-shorting prevention period Th is adjusted to the predetermined value Lm.

Embodiment 4

Figure 4:
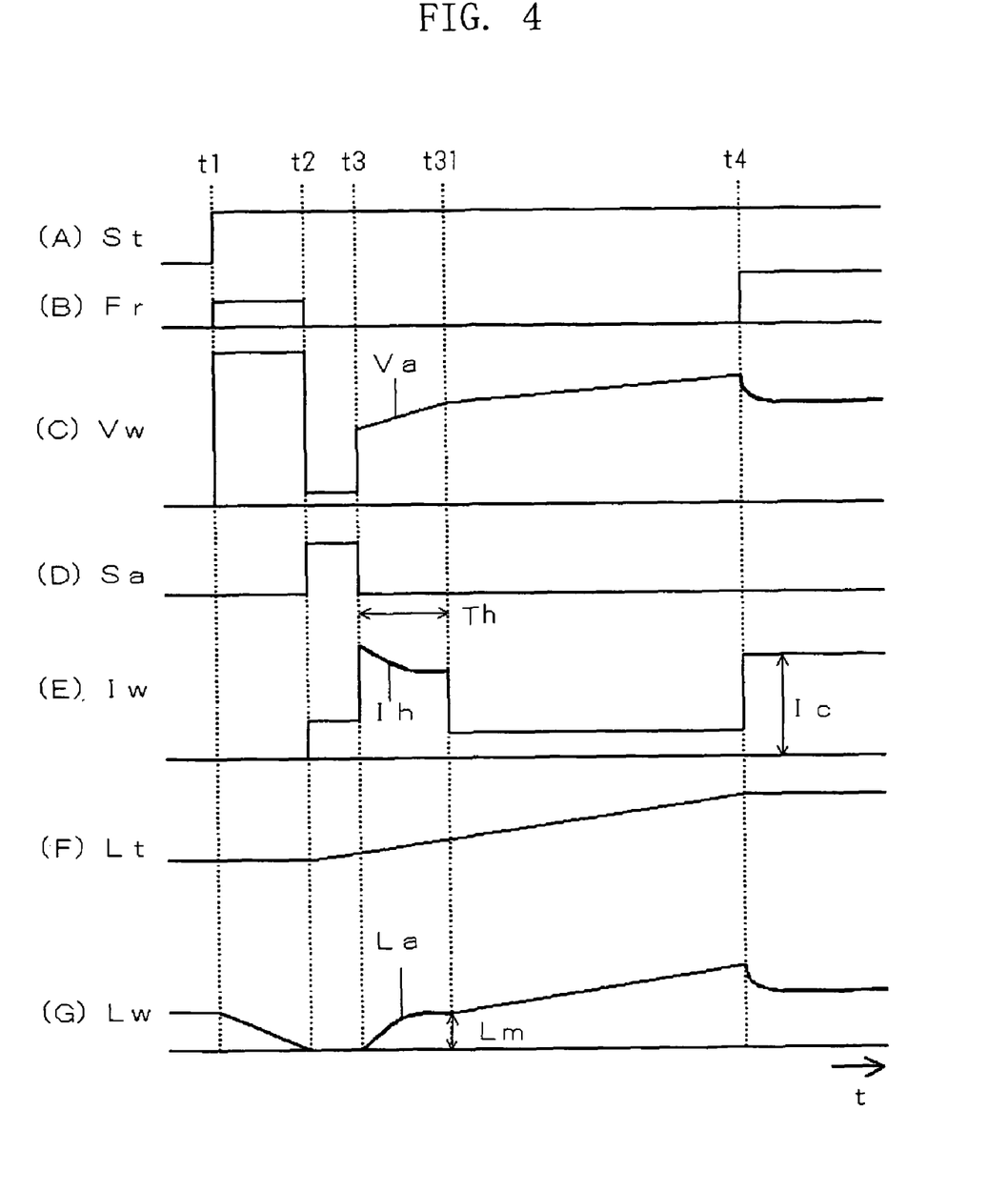
FIG. 4 is a timing chart of an arc start control method in robot welding as Embodiment 4 according to the present invention.

FIG. 4 is a timing chart of an arc start control method in robot welding according to Embodiment 4 of the present invention. This figure corresponds to the above-described FIGS. 1 through 3, differing only in that variable control is provided to both of the re-shorting prevention period Th and the re-shorting prevention current Ih. Hereinafter, the difference will be described with reference to FIG. 4.

In FIG. 4, variable control is provided to the re-shorting prevention period Th and the re-shorting prevention current Ih, in response to the arc voltage Va. In the same way as Embodiment 2, the re-shorting prevention period Th ends when the arc voltage Va reaches the predetermined value Vm. In the same way as Embodiment 3, the re-shorting prevention current Ih is varied substantially in inverse proportion to the arc voltage Va. In other words, Embodiments 2 and 3 are performed simultaneously in the present embodiment. This brings the arc length La to the predetermined value Lm at the end of the re-shorting prevention period Th.

The invention claimed is:

1. An arc start control method in robot welding comprising the steps of:
   shorting a welding wire with a base metal while applying a short-circuit current;
   retracting a welding torch by a welding robot for taking the welding wire off the base metal to generate an initial arc;
   retracting the welding torch to a predetermined position with the initial arc maintained while applying an initial arc current smaller than a steady welding current during an initial arc period; and
   starting to feed the welding wire steadily and to supply the steady welding current so as to make a transition from the initial arc to a steady arc as well as starting to move the welding torch along a welding line,
   applying a re-shorting prevention current, which is larger than the short-circuit current and the initial arc current, during a re-shorting prevention period, which starts when the welding torch retracts to a position for forming a gap between the welding wire and the base metal, in order to prevent re-shorting between a tip of the wire and the base metal right after the initial arc was generated, and thereafter, applying the initial arc current;
   increasing a welding voltage continuously at a first rate while maintaining a welding current at the re-shorting prevention current during the re-shorting prevention period; and
   decreasing the welding current from the re-shorting prevention current to the initial arc current to terminate the re-shorting prevention period and increasing the welding voltage continuously at a second rate that is lower than the first rate during the initial arc period.

2. The arc start control method in robot welding according to claim 1, wherein the re-shorting prevention period ends when the welding voltage has substantially attained a predetermined arc voltage which corresponds to a predetermined arc length.

3. The arc start control method in robot welding according to claim 1, wherein the re-shorting prevention current is varied substantially in inverse proportion to the arc voltage.

4. The arc start control method in robot welding according to claim 2, wherein the re-shorting prevention current is varied substantially in inverse proportion to the arc voltage.

5. An arc start control method in robot welding comprising the steps of:
- shorting a welding wire with a base metal while applying a short-circuit current;
- retracting a welding torch by a welding robot for taking the welding wire off the base metal to generate an initial arc;
- retracting the welding torch to a predetermined position with the initial arc maintained while applying an initial arc current smaller than a steady welding current during an initial arc period; and
- starting to feed the welding wire steadily and to supply the steady welding current so as to make a transition from the initial arc to a steady arc as well as starting to move the welding torch along a welding line,
- applying a re-shorting prevention current, which is larger than the short-circuit current and the initial arc current, during a re-shorting prevention period, which starts when the welding torch retracts to a position for forming a gap between the welding wire and the base metal, in order to prevent re-shorting between a tip of the wire and the base metal right after the initial arc was generated, and thereafter, applying the initial arc current;
- increasing a welding voltage continuously at a first rate while decreasing a welding current during the re-shorting prevention period from a peak first value of the re-shorting prevention current to a lower second value of the re-shorting prevention current that is still higher than the initial arc current; and
- decreasing the welding current from the second value of the re-shorting prevention current to the initial arc current to terminate the re-shorting prevention period and increasing the welding voltage continuously at a second rate that is lower than the first rate during the initial arc period.

* * * * *